US010616195B2

(12) United States Patent
Anderson et al.

(10) Patent No.: US 10,616,195 B2
(45) Date of Patent: Apr. 7, 2020

(54) COMPUTERIZED SYSTEM AND METHOD FOR AUTOMATICALLY SHARING DEVICE PAIRING CREDENTIALS ACROSS MULTIPLE DEVICES

(71) Applicant: OATH INC., New York, NY (US)

(72) Inventors: Neil Anderson, New York, NY (US); Roberto Osorio-Goenaga, Brooklyn, NY (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/174,556

(22) Filed: Oct. 30, 2018

(65) Prior Publication Data

US 2019/0075093 A1 Mar. 7, 2019

Related U.S. Application Data

(63) Continuation of application No. 15/373,373, filed on Dec. 8, 2016, now Pat. No. 10,129,231.

(51) Int. Cl.
*H04L 29/06* (2006.01)
*H04W 4/80* (2018.01)
(Continued)

(52) U.S. Cl.
CPC ........ *H04L 63/062* (2013.01); *H04L 63/0428* (2013.01); *H04L 63/083* (2013.01); *H04L 63/0876* (2013.01); *H04L 63/10* (2013.01); *H04L 67/104* (2013.01); *H04L 67/306* (2013.01); *H04L 67/34* (2013.01); *H04W 4/80* (2018.02); *H04W 12/003* (2019.01); *H04W 12/06* (2013.01); *H04W 12/00403* (2019.01);
(Continued)

(58) Field of Classification Search
CPC . H04L 63/062; H04L 63/0428; H04L 63/083; H04L 63/0876; H04L 63/10; H04L 67/104; H04L 67/34; H04W 4/80; H04W 84/042; H04W 84/12
See application file for complete search history.

(56) References Cited

U.S. PATENT DOCUMENTS 8,571,882 B1 10/2013 Teitelbaum
8,892,866 B2 11/2014 Schilling et al.
(Continued)

*Primary Examiner* — Techane Gergiso
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods automatically pair and unpair hardware devices that are logged into a single account. Once a user logs into their profile associated with an online account, the disclosed systems and methods perform the novel, computerized steps of auto-pairing any or all of the other devices that are also logged into the account. The disclosed systems and methods allow any number of devices to be automatically paired or unpaired through shared password-less credentials associated with a single profile.

17 Claims, 9 Drawing Sheets

(51) Int. Cl.
*H04L 29/08* (2006.01)
*H04W 12/06* (2009.01)
*H04W 12/00* (2009.01)
*H04W 84/12* (2009.01)
*H04W 84/04* (2009.01)
*H04W 84/00* (2009.01)

(52) U.S. Cl.
CPC ........ *H04W 84/005* (2013.01); *H04W 84/042* (2013.01); *H04W 84/12* (2013.01)

(56) References Cited

U.S. PATENT DOCUMENTS

| | | |
|---|---|---|
| 9,596,237 B2 | 3/2017 | Law et al. |
| 9,928,377 B2 | 3/2018 | Narayanaswamy et al. |
| 2005/0099963 A1 | 5/2005 | Multer et al. |
| 2013/0019299 A1 | 1/2013 | Vepsalainen et al. |
| 2013/0174252 A1* | 7/2013 | Weber ................. G06F 21/6218 726/20 |
| 2015/0082399 A1* | 3/2015 | Wu ..................... G06F 21/6209 726/6 |
| 2015/0143129 A1 | 5/2015 | Duffy |
| 2016/0140335 A1 | 5/2016 | Proulx et al. |
| 2016/0142758 A1* | 5/2016 | Karp ....................... H04W 4/80 725/25 |
| 2016/0180343 A1 | 6/2016 | Poon et al. |
| 2016/0277368 A1* | 9/2016 | Narayanaswamy ......................... G06F 21/6218 |
| 2017/0055156 A1* | 2/2017 | Myers ..................... H04L 41/28 |

* cited by examiner

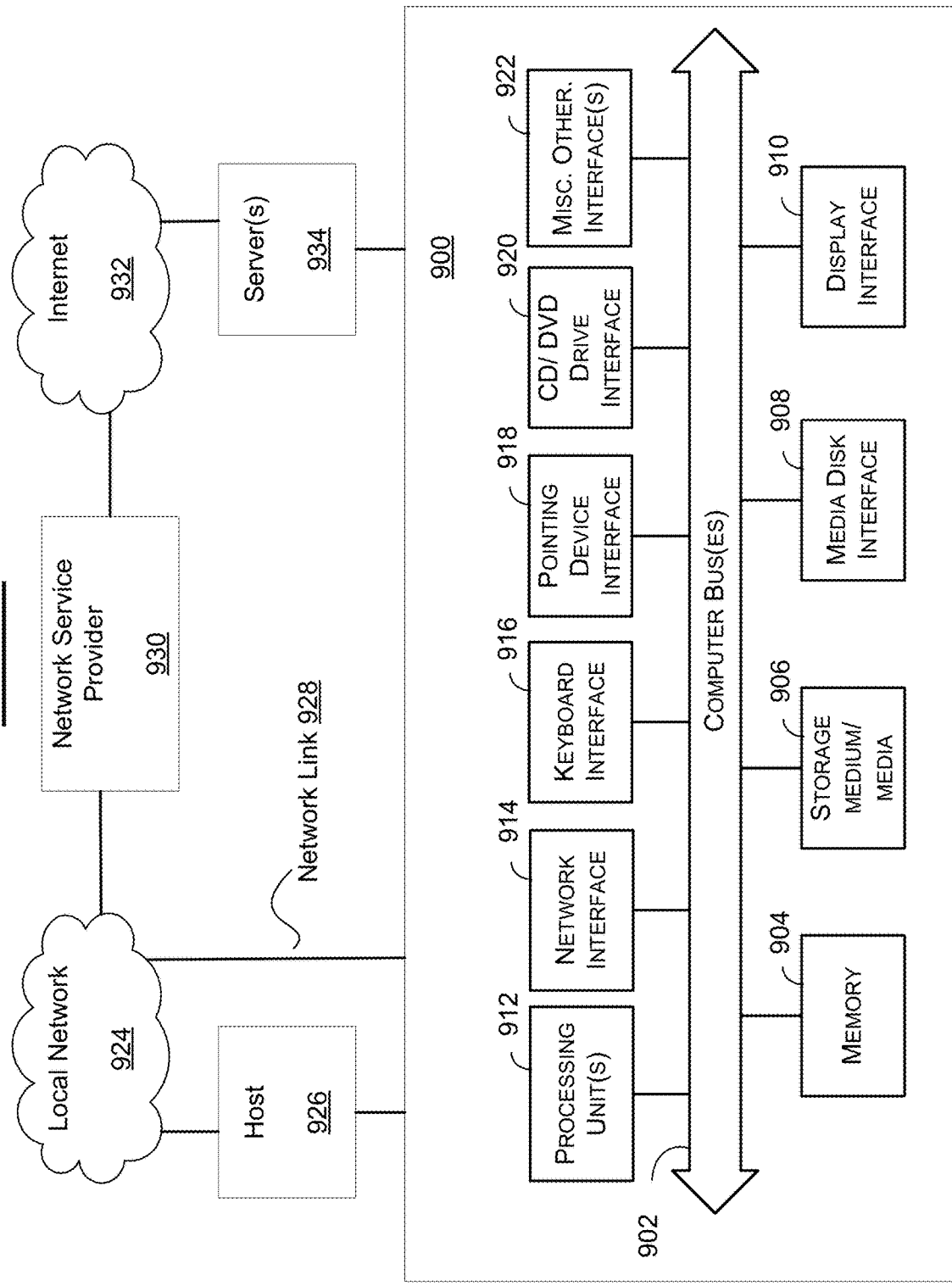

COMPUTERIZED SYSTEM AND METHOD FOR AUTOMATICALLY SHARING DEVICE PAIRING CREDENTIALS ACROSS MULTIPLE DEVICES

This patent application claims the benefit of and is a continuation of U.S. patent application Ser. No. 15/373,373, filed on Dec. 8, 2016, titled "Computerized System And Method For Automatically Sharing Device Pairing Credentials Across Multiple Devices", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer devices, systems and/or platforms by modifying the capabilities and providing non-native functionality to such devices, systems and/or platforms for a novel and improved framework for automatically sharing peer-to-peer device pairing credentials across multiple devices.

SUMMARY

According to some embodiments, the disclosed systems and methods provide a computerized framework for automatically pairing and unpairing hardware devices that are logged into a user's account. The disclosed systems and methods provide hardware devices with the novel, automated functionality of pairing, or connecting, with another device when such devices are logged into the same authenticated user account.

As discussed in more detail below, once a user logs into their profile associated with an online account (e.g., Yahoo!® account), the disclosed systems and methods perform the novel, computerized steps of automatically connecting, referred to as "auto-pairing," any or all of the other devices that are also logged into the profile or account. The disclosed systems and methods allow any number of devices to be automatically paired through shared password-less credentials associated with a single profile; therefore, a plurality of associated or peripheral devices can be connected without the explicit, cumbersome steps of having the user and/or device logging in to the account and/or go through the subsequent pairing process.

There are currently myriad peer-to-peer sharing systems. For example, "pairing" exists in many device-peripheral technologies, e.g., Bluetooth®. However, there is no current system or process that enables or performs automated connectivity of multiple devices to peripheral devices, or the sharing of credentials that enables such automated pairing to occur.

Accordingly, in one or more embodiments, a method is disclosed for a novel and improved framework for automatically sharing peer-to-peer device pairing credentials across multiple devices thereby enabling such devices to automatically pair and/or unpair without additional user or device input. The disclosed systems and methods provide a novel and improved manner of accomplishing secure peer-to-peer pairing across multiple devices attached to or associated with a single account. As evidenced from the disclosure herein, the disclosed systems and methods build on existing secure peer-to-peer authentication techniques, and extend their functionality to make a more seamless user experience. In situations (becoming more common) where users have more than one device, or want to more easily share authentication in group or family settings, the disclosed systems and methods simplify the management of pairing devices to peripherals (and revoking of paired devices).

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically sharing peer-to-peer device pairing credentials across multiple devices.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 9 is a block diagram illustrating the architecture of an exemplary hardware device in accordance with one or more embodiments of the present disclosure.

DESCRIPTION OF EMBODIMENTS

Figure 1:
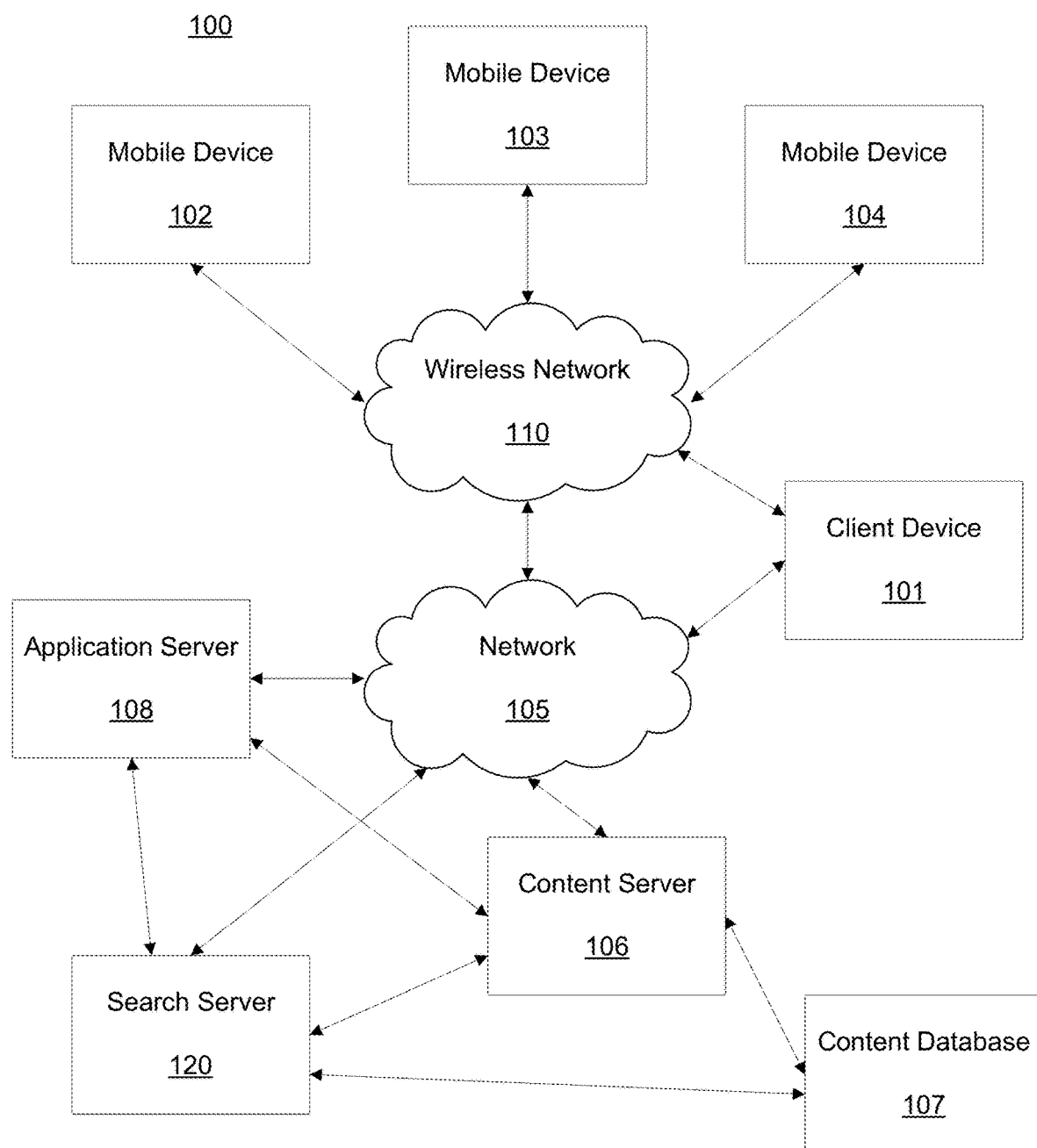
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth®, Bluetooth Low Energy (BLE), 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

The principles described herein may be embodied in many different forms. The disclosed systems and methods provide an improved, computerized framework for automatically pairing and unpairing hardware devices that are logged into the same network/online account.

By way of background, existing peer-to-peer (P2P) pairing solutions only maintain their credentials locally. Therefore, in order for such devices to pair with another device, a number of locally entered steps need to be performed, mostly by a user of such device, in order for such device to recognize and then connect with the other device.

The instant disclosure addresses these shortcomings, among others, by providing an auto-pairing (and auto-unpairing) computerized framework that enables devices to share credentials automatically by leveraging each instance of devices being signed into a single online account. According to some embodiments of the instant disclosure, if multiple hardware devices (e.g. smartphones) are logged into the same online account (e.g. Yahoo! ® account), pairing one of the hardware devices to a peripheral device (e.g. SmartTV) allows all other hardware devices logged into the same authenticated account to be auto-paired to the peripheral device. Such auto-pairing enables any and/or all of a user's devices to be automatically paired without requiring the user or the devices to explicitly go through the pairing process. Additionally, by not having to enter a password or a PIN each time devices are to be paired, which in the field of art is viewed as a point of failure or weakness, the time for pairing (and unpairing) is significantly reduced.

An added benefit to the disclosed systems and methods involves the capability to unpair devices more easily, as any pairs associated with a profile can be removed en-masse or individually, without requiring physical access to the device (in the case of theft of a device, for example). This not only improves flexibility of how pairing of devices can be enacted and revoked, but also adds a layer of security not present in today's device pairing and information sharing field. The instant disclosure's removal of the reliance on passwords and other locally stored and entered credentials in order to pair devices, as in conventional systems, though the auto-pairing systems and methods discussed herein, provides a secure, hidden computerized scheme which is used to control or manage how multiple devices interact with peripheral devices. The disclosed, computerized mechanisms for pairing are performed in accordance with active account credentials (e.g., the devices are logged in to an account) by leveraging the dependence on a third party source (e.g., Yahoo! ® account or cloud server), which evidences increased accuracy, reliability and security for the paired devices and the information housed and shared on those paired devices. Thus, the disclosed systems and methods provide novel, secure and improved mechanisms for establishing, controlling and managing P2P pairing across multiple devices associated with (e.g., logged into) an online account.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and search server 120.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), Dynamic HTML (DHTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as a photo sharing site/service (e.g., Tumblr®), an email platform or social networking site, a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers, desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo! ® Search), a mail or messaging application (e.g., Yahoo! ® Mail, Yahoo! ® Messenger), and the like, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 120.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
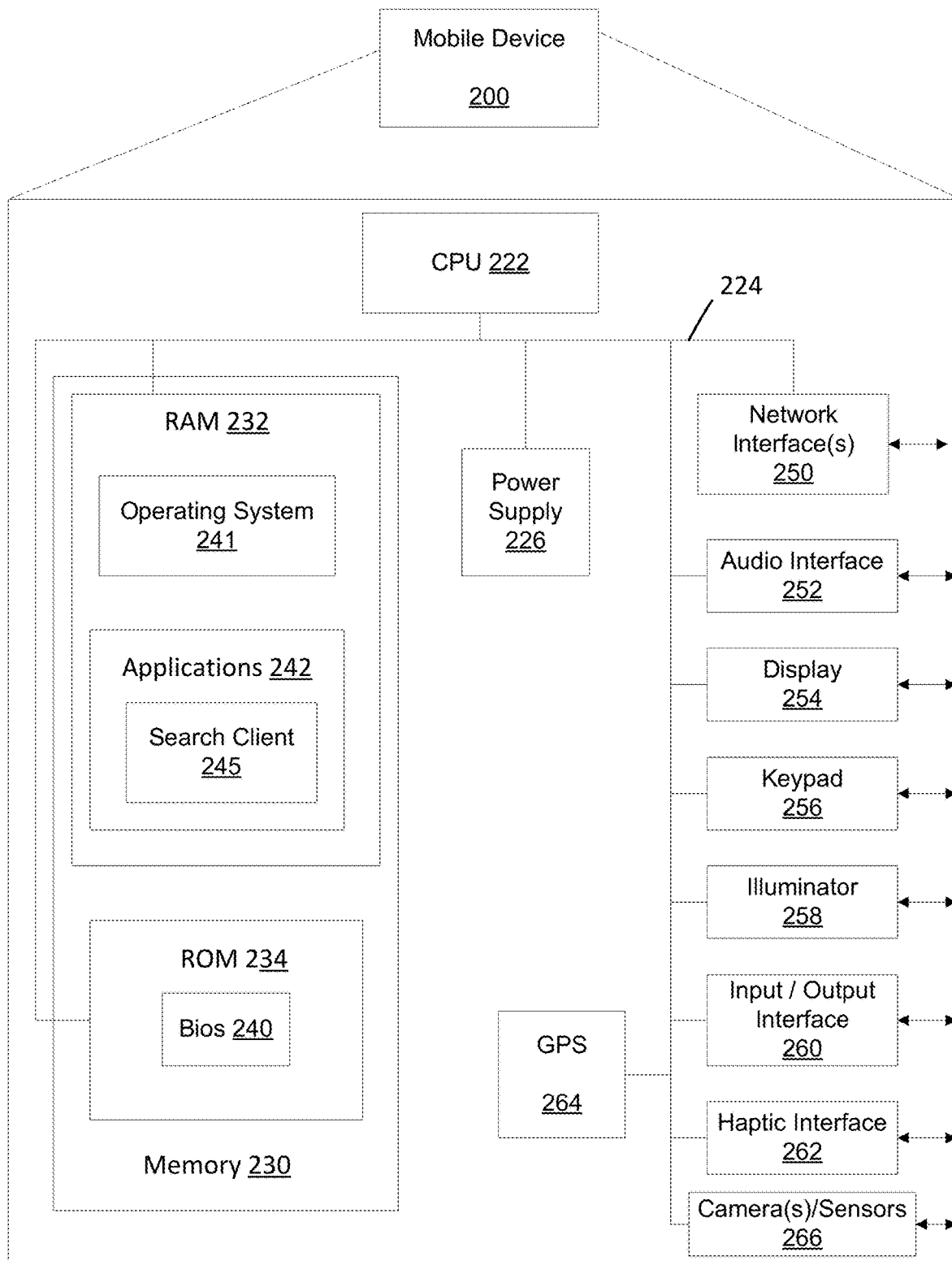
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content or other forms of digital data associated with, but not limited to, IMs, emails, and other types of known messages, or the like.

Having described the components of the general architecture employed within the disclosed systems and methods, the components' general operation with respect to the disclosed systems and methods will now be described below.

Figure 3:
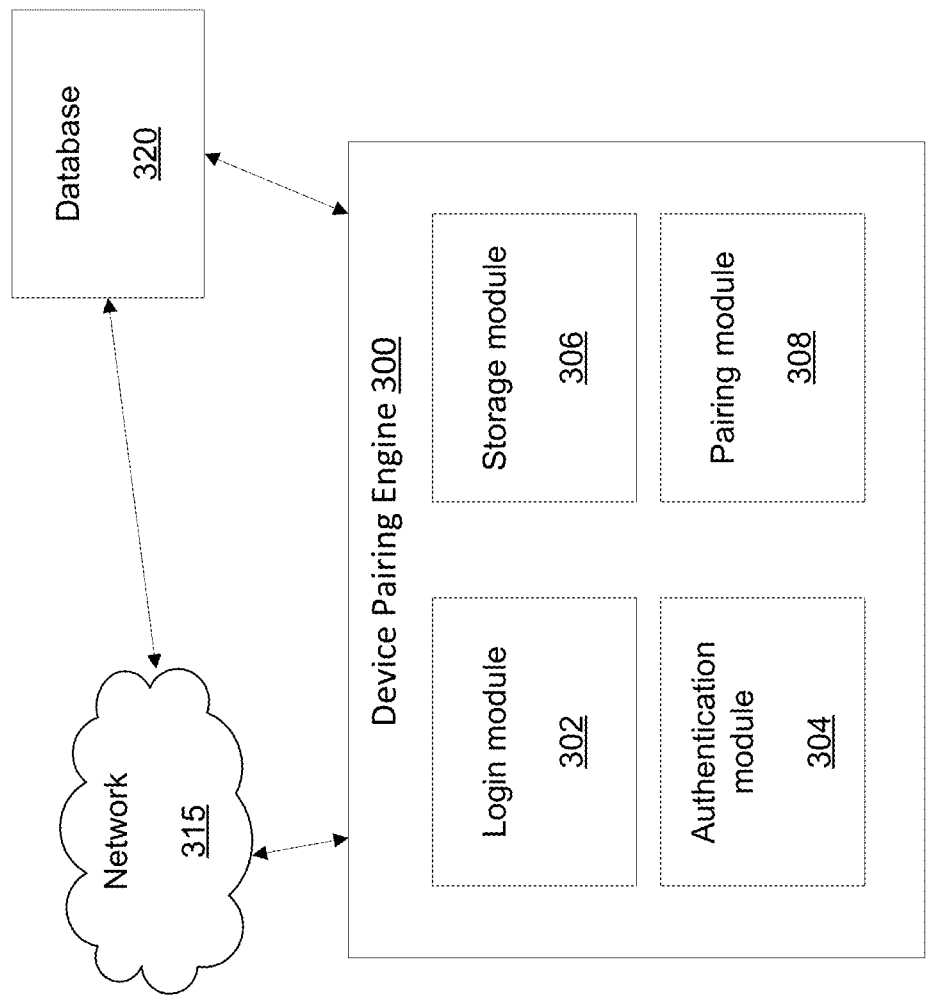
FIG. 3 is a schematic block diagram illustrating components of an exemplary system in accordance with some embodiments of the present disclosure.

FIG. 3 is a block diagram illustrating the components for performing the systems and methods discussed herein. FIG. 3 includes a device pairing engine 300, network 315 and database 320. The device pairing engine 300 can be a special purpose machine or processor and could be hosted by an application server, content server, social networking server, web server, search server, content provider, email service provider, ad server, user's computing device, and the like, or any combination thereof.

According to some embodiments, device pairing engine 300 can be embodied as a stand-alone application that executes on a user device. In some embodiments, the device pairing engine 300 can function as an application installed on the user's device, and in some embodiments, such application can be a web-based application accessed by the user device over a network. In some embodiments, the device pairing engine 300 can be installed as an augmenting script, program or application to another media and/or content hosting/serving application, such as, for example, Yahoo!® Search, Yahoo!® Mail, Flickr®, Tumblr®, Twitter®, Instagram®, SnapChat®, Facebook®, Amazon®, YouTube®, AppleTV® and the like.

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 can comprise, for example, a dataset of content items (e.g., video files, multimedia files, images and the like), device data and associated metadata, and user data and associated user metadata. Such information can be stored in the database 320 independently and/or as a linked or associated dataset. It should be understood that the data (and metadata) in the database 320 can be any type of content, user, device or network information and type, whether known or to be known, without departing from the scope of the present disclosure.

Database 320 comprises a dataset of data and metadata associated with local and/or network information related to users, devices, services, applications, user-generated content, third party provided content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

According to some embodiments, the user data can also include device information including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for, upload, download, share, edit or otherwise avail users to content or networked services (e.g., Yahoo!® Search, Yahoo!® Mobile applications, Yahoo!® Mail, Flickr®, Tumblr®, Twitter®, Instagram®, SnapChat®, Facebook®, Amazon®, YouTube®, and the like). In some embodiments, database 320 can comprise data and metadata associated with such content information from one and/or an assortment of media hosting sites. In some embodiments, such content provider information can include, but is not limited to, versions, types and/or capabilities of applications that are resident or accessed by a user device, and/or are capable of being downloaded, executed, accessed or run on user device for purposes of rendering content or accessing a network service.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the device pairing engine 300, and the database of stored resources 320. Indeed, as illustrated in FIG. 3, the device pairing engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as device pairing engine 300, and includes login module 302, authentication module 304, storage module 306 and pairing module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
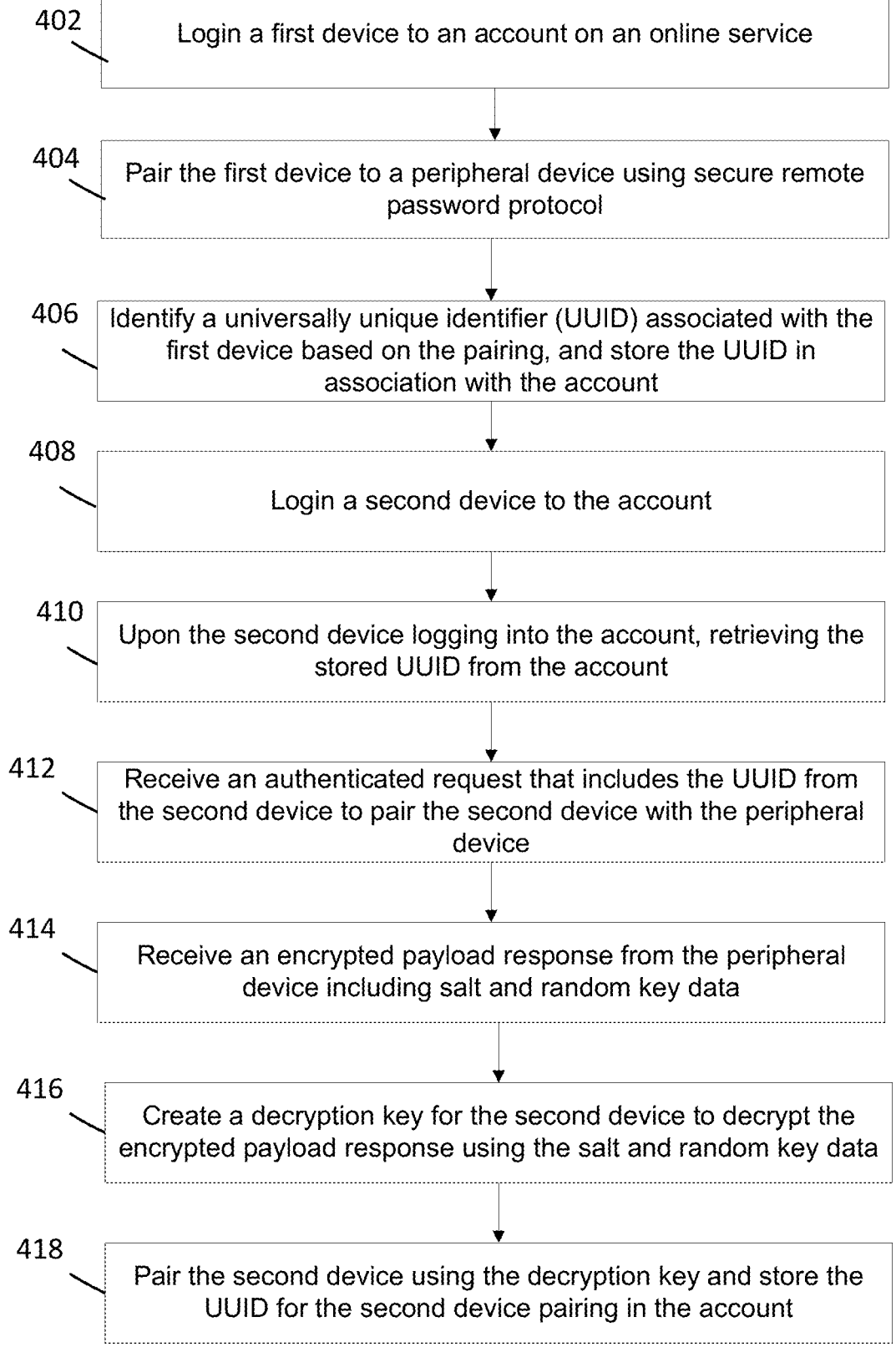
FIG. 4 is a flowchart illustrating steps performed in accordance with some embodiments of the present disclosure.

Turning to FIG. 4, Process 400 details steps performed in accordance with some embodiments for automatically pairing and unpairing hardware devices that are logged into a user's account. For example, according to some embodiments as discussed herein, if two smartphones are logged into the same online account (e.g. Yahoo! ® account), pairing one of the smartphones to a peripheral device (e.g. SmartTV or smart watch) allows the other smartphone to be auto-paired to the peripheral device. Such auto-pairing enables any and/or all of a user's devices to be automatically paired without requiring the user or the devices to explicitly go through the pairing process.

For purposes of simplicity in disclosure, the discussion herein will involve communication of information between devices and pairing of such devices occurring at or within a location, and such location can be a room, house, building, vehicle, train car, airplane cabin, office, devices being worn and/or carried by a person, and the like. However, while the discussion herein will focus on devices at a single location (e.g., a user's home), it should not be construed as a limiting, as expansion of the location to outside such location, or even around the world (e.g., within a city, town, country, hemisphere, and the like) will be understood by those of skill in the art as not limiting the scope and applicability of the disclosed systems and methods.

As discussed in more detail below, Steps 402 and 408 of Process 400 are performed by the login module 302 of the device pairing engine 300; Step 404 is performed by the pairing module 308; Step 406 is performed by the storage module 306; Step 418 is performed by the pairing module 308 and the storage module 306; and Steps 410-416 are performed by the authentication module 304.

Process 400 begins with Step 402 where a user of a device, for example a mobile device as illustrated in FIGS. 1-2, logins into an online account (e.g., Yahoo! ®) from the device. As understood by those of skill in the art, such login process can involve the user being prompted to enter login credentials upon, for example, opening an application associated with the account, loading the web page associated with the account, or any other known or to be known methodology for accessing resources associated with a secure networked account. These credentials are associated with an account identifier—for example, a Yahoo! ID (or YID) which is stored on a network server (e.g., a cloud server).

For purposes of this disclosure, differing devices will be referred to as a "first" device, "second" device, and so on; however it should not be construed as limiting as to the number of devices, or the order of such devices within Process 400, as the numerical characterization of such devices is simply used to differentiate the devices being used within Process 400. Therefore, the device logged into during Step 402 will be referred to as the "first" device.

Upon logging into the account, the first device is paired to a peripheral device. Step 404. In some embodiments, Step 404 can involve the device pairing engine 300 determining a location of the first device and scanning the location according to a threshold distance to identify peripheral devices within a distance threshold satisfying range. For example, if the first device is a mobile phone and the user logs into his Yahoo! ® account upon entering his house, the engine 300 can determine that there is a peripheral device—a SmartTV—located in the same room. Such determination and pairing can be performed using any known or to be known pairing technology, such as, but not limited to, Bluetooth®, Bluetooth Low Energy (BLE) signals, WiFi®, infrared, Near Field Communication (NFC) technology, and the like. Thus, in some embodiments Step 404 involves the set up and linkage between the first device and the peripheral device thereby allowing electronic communication between them.

According to some embodiments, Step 404 involves the first device transmitting the universally unique identifier (UUID) associated with the first device to the peripheral device. In response to receiving the first device's UUID, the peripheral device begins authentication in order to ensure that the first device is within proximity (at a threshold value) of the peripheral. In some embodiments, such authentication can involve performing any known or to be known authentication and/or key-exchange algorithm, technology or technique. For example, Step 404 can involve, according to some embodiments, implementing secure remote password protocol (SRP) or any other know or to be known password-authenticated key agreement (PAKE) protocol. In some embodiments, SRP or PAKE protocols may send a request to the first device asking the user to enter his/her PIN which authenticates the user (e.g., such PIN can be the PIN for gaining access to the first device or another PIN established for accessing the account). In combination or in the alternative to a PIN, according to some embodiments, the request may ask the user to enter biometric information or any other type of information to authenticate the user on the first device.

Figure 5:
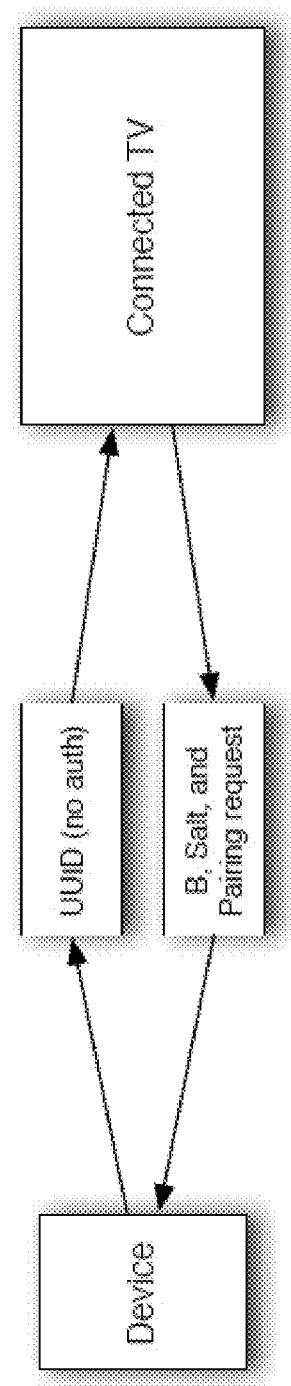
FIG. 5 illustrates a non-limiting example embodiment of device credential sharing functionality in accordance with some embodiments of the present disclosure.

In response to the first device being approved via SRP protocol, as discussed above, the first device is paired with the peripheral device. Such pairing, as understood by those of skill in the art, involves the first device receiving from the peripheral device random data (e.g., a hash of a passcode or passphrase) and a key for unlocking the random data (referred to as "Salt" or "Salt data", in interchangeably, and "B", respectively). Thus, as illustrated in FIG. 5, the device sends a request including its UUID to the peripheral device and in response to performing SRP, the peripheral device sends back Salt and B data, where the first device uses the key to unlock the Salt, as per SRP protocol, thereby pairing the two devices.

In Step 406, upon the first device and peripheral device being paired in Step 404, the UUID of the first device is stored in a database in association with the user's account (e.g., in a profile or lookup table (LUT) associated with the user's profile). In some embodiments, the database is associated with the service providing the account—for example, a database associated with a cloud server for the service (e.g., Yahoo!® Cloud server). In some embodiments, the B and Salt for the first device are also stored in the database in a similar manner, as discussed in more detail below and illustrated in FIGS. 6-8.

In Step 408, a second device logs into the account. In some embodiments, Step 408 can be performed in concert with Step 402—for example, Step 402 can involve logging in multiple devices associated with the user to a network service account. Step 408 can be performed in a similar manner as discussed above in relation to Step 402.

Figure 6:
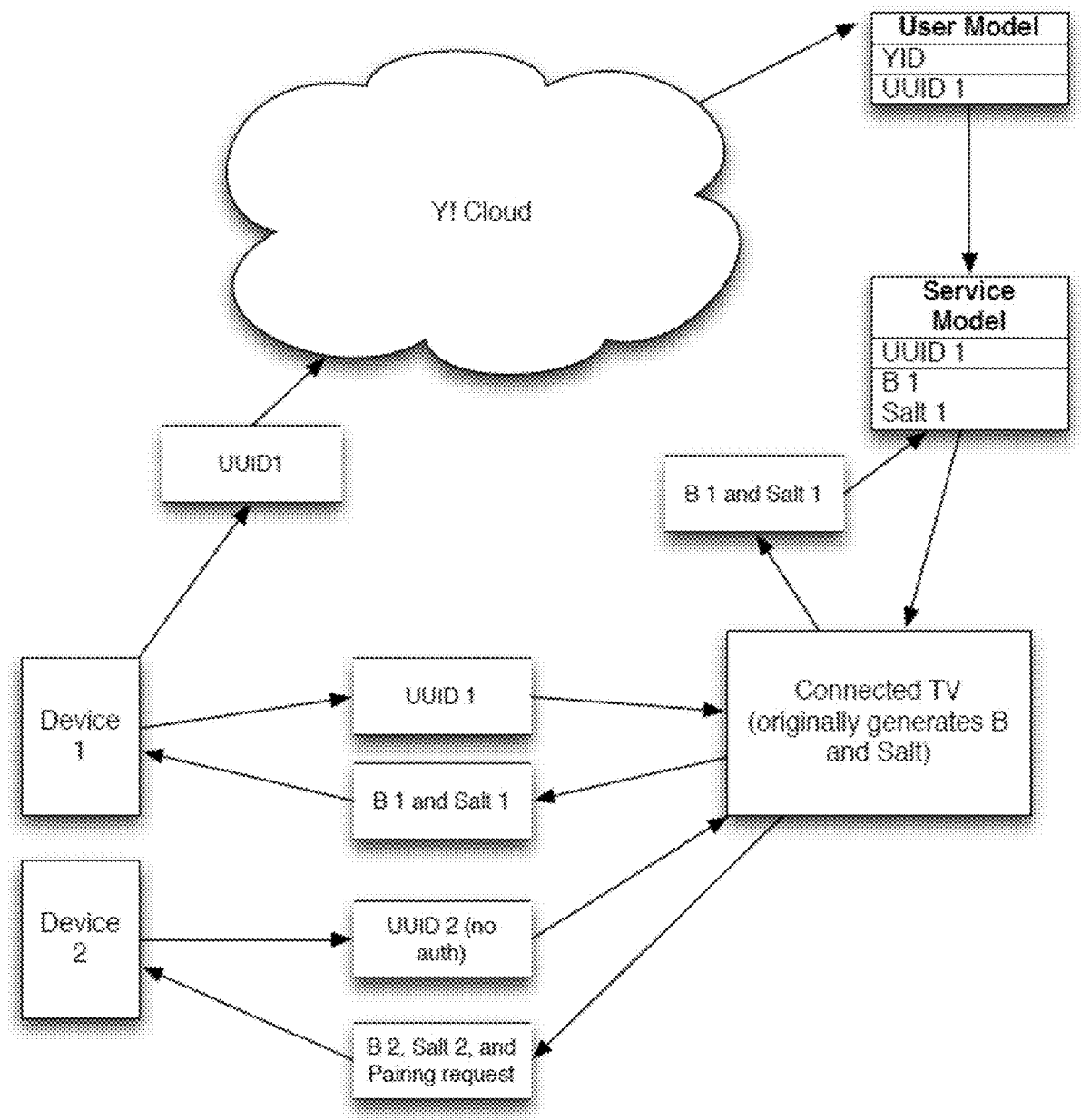
FIG. 6 illustrates a non-limiting example embodiment of device credential sharing functionality in accordance with some embodiments of the present disclosure.

For example, as illustrated in FIG. 6, after the first device ("Device 1" in FIG. 6) is logged in and paired with the peripheral device ("Connected TV"), and the UUID of the first device is stored in the database (e.g., stored in association with the ID of the user (YID) in the user model housed on the "Y! Cloud"), as in Steps 402-406 discussed above, the second device ("Device 2") is logged in and paired in a similar manner. Device 2 sends its UUID (referred to as "UUID 2" in FIG. 6) to the peripheral device ("Connected TV"), and in response another version of the B and Salt ("B2" and "Salt 2") are generated upon performance of SRP, thereby pairing Device 2 with the peripheral device. The storage of the UUID, B and Salt for the second device is discussed in more detail below in relation to FIG. 7.

In embodiments where Step 408 is separate from Step 402, or even occurring in concert with Step 402, Process 400 proceeds next to Step 410. In Step 410, upon the second device logging into the account, or in some embodiments being detected as being logged into the account upon the first device being paired, the stored UUID (from Step 406) is retrieved. According to some embodiments, the retrieval of the UUID in the account can be based on the identifier (ID) of the account—for example, the Yahoo!® ID (YID) of the user's Yahoo!® account. In some embodiments, using a search or hash map to identify the UUID associated with the YID of the user, the UUID can be identified and retrieved. For example, since the second device is logged into the account, the ID of the user's account (e.g., YID) is used as a search term to identify the UUID(s) stored in association with the user, and upon identifying the UUID(s), it is retrieved and sent to the second device.

In Step 412, the second device sends an authentication request comprising information related to the retrieved UUID (or in some embodiments, a version of the retrieved UUID) to the peripheral device thereby requesting pairing with the peripheral device. Upon receiving the request, which involves parsing the request to determine if an authenticated UUID is present within the request, the peripheral device responds with an encrypted payload that includes Salt and random key data. Step 414. In some embodiments, this Salt and random key data are different from that provided to the first device, and in some embodiments, the data is the same. As discussed above and in more detail below, this Salt and random key data is used to pair the second device to the peripheral.

In some embodiments, the payload can be encrypted according any known or to be known encryption technology or protocol, such as, for example, SRP or PAKE, as discussed above, or in some embodiments, a standard 128/256 bit AES (Advanced Encryption Standard) algorithm, approved by the NIST (National Institute of Standards and Technology), and uses both Symmetric and Asymmetric encryption/decryption keys.

In Step 416, a decryption key is generated for the second device in order to decrypt the payload using the Salt and random key data. In some embodiments, as understood by those of skill in the art, the decryption key is associated with and/or generated from the random key data (e.g., "B", as discussed above), in order to decrypt the Salt, which enables pairing. Thus, as in Step 418, the second device is automatically paired using the generated decryption key. As a result of the pairing, the UUID of the second device, and in some embodiments, the Salt and random key data sent to the second device, are also stored in the cloud database, in a similar manner as discussed above.

In some embodiments, Steps 410-418 can be performed automatically upon the logging in or detection of the second device at the location (or within the proximity of the peripheral device). Therefore, in some embodiments, upon the first device pairing with the peripheral, as in Steps 402-406, and upon the second device logging in, or in some embodiments, being detected as already being logged in after the first device pairs with the peripheral, Steps 410-418 are automatically performed for the second device, thereby enabling the second device to be also paired with the peripheral automatically.

In some embodiments, upon a third device logging into the account, or detection of a third device already being logged into the account, the third device can be automatically paired with the peripheral according to the Steps 410-418, as discussed above. Any number of devices can be paired according to the Steps 402-418, and more specifically, Steps 410-418. Thus, after a first device is paired, upon subsequent devices being authenticated (e.g., via the Salt and random data key provided from SRP being performed by the peripheral, as needed), or determined to be already authenticated (e.g., determined that a UUID for the subsequent device(s) is already stored in the cloud), such devices can be automatically paired with the peripheral.

Figure 7:
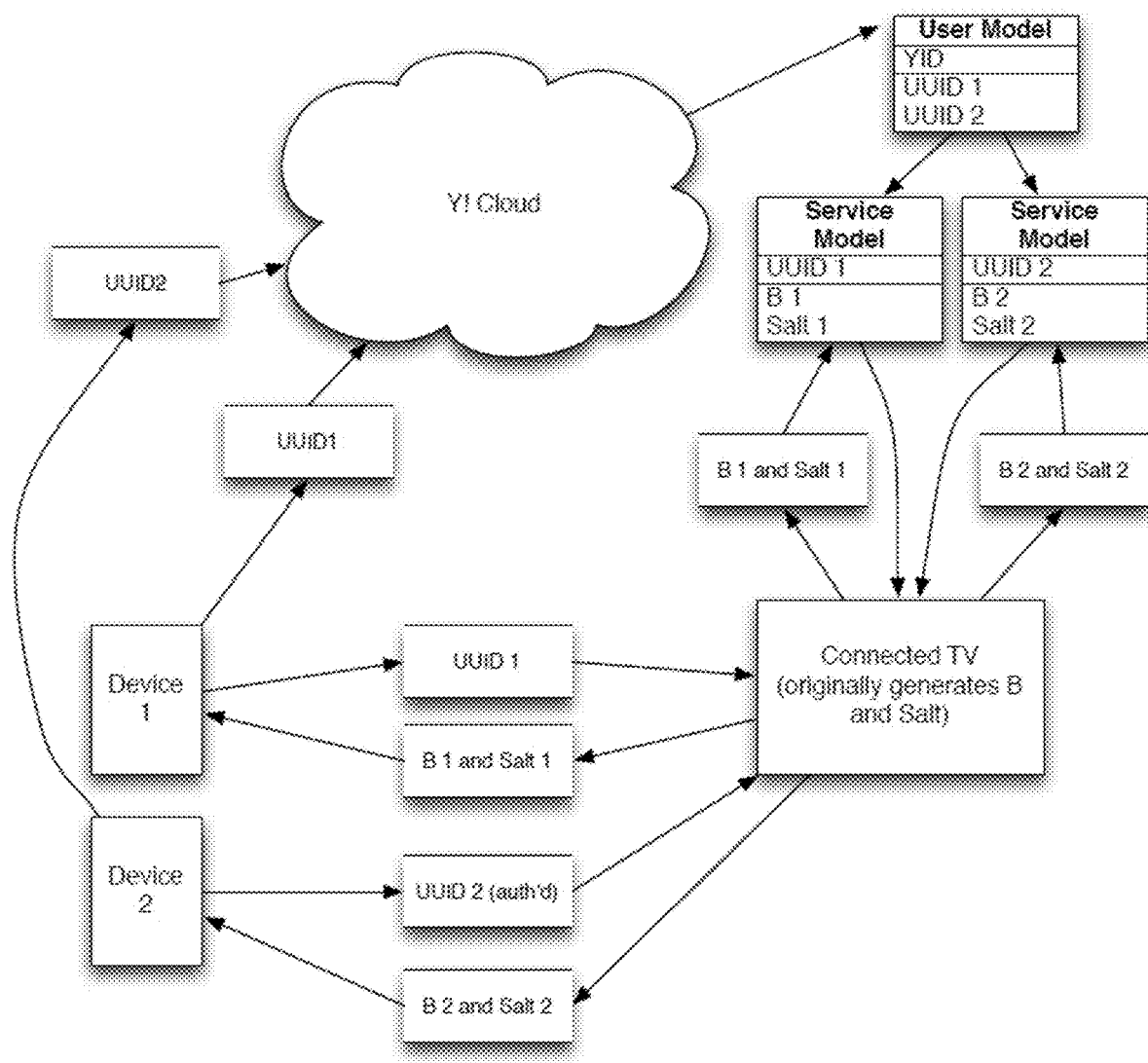
FIG. 7 illustrates a non-limiting example embodiment of device credential sharing functionality in accordance with some embodiments of the present disclosure.
Figure 8:
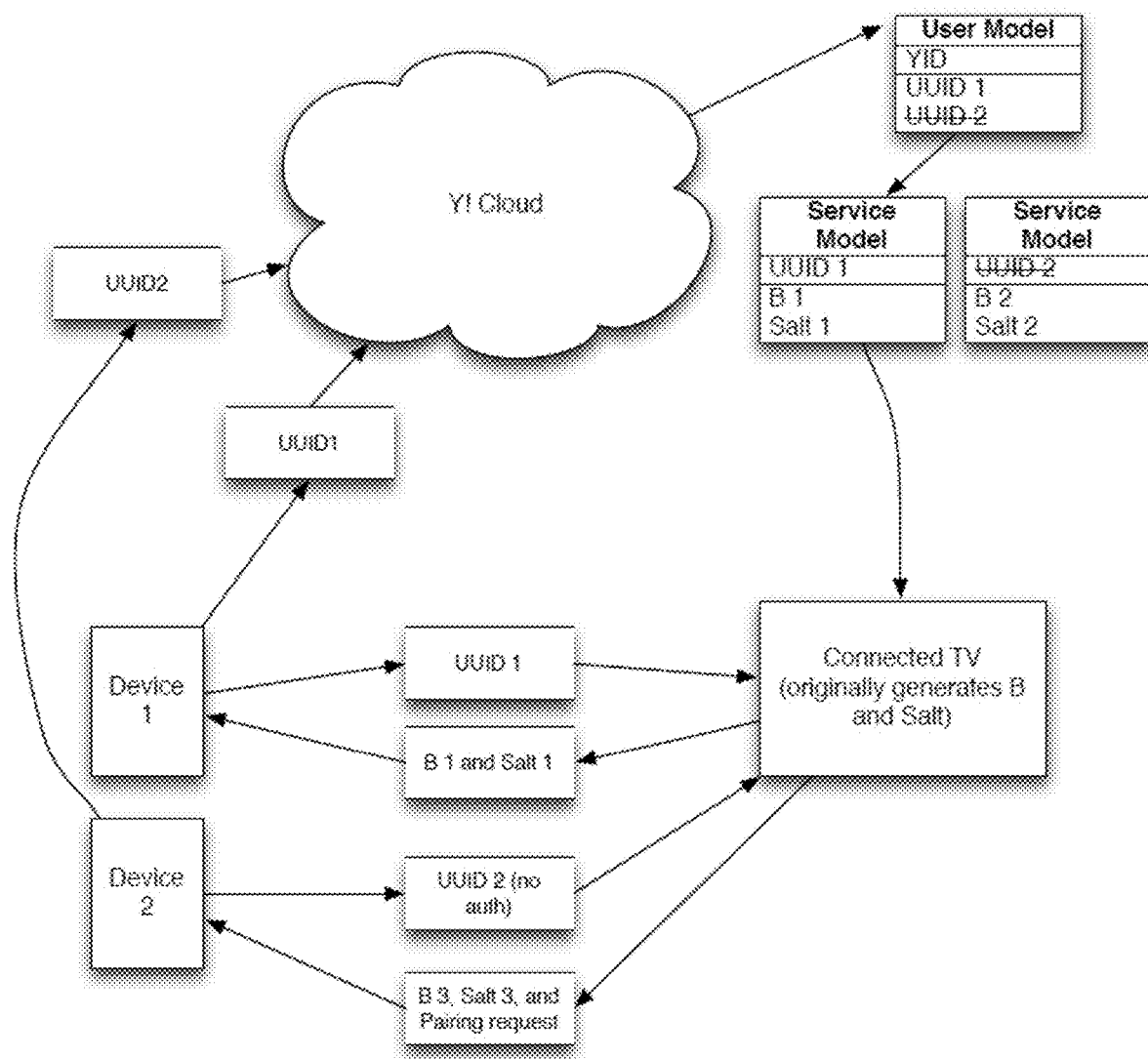
FIG. 8 illustrates a non-limiting example embodiment of device credential sharing functionality in accordance with some embodiments of the present disclosure.

Non-limiting embodiments of pairing devices with a peripheral according to Process 400 discussed above are discussed in more detail in relation to FIGS. 6-8.

FIG. 6, as briefly discussed above, involves the authentication and pairing of two devices to a peripheral: Device 1 and Device 2, and Connected TV, respectively. In accordance with the discussion of FIG. 5, as discussed above, Device 1 has already been authenticated (or registered) and paired, and the UUID, Salt and B for Device 1 have been stored in the cloud database. Storage of UUID1, B1 and Salt 1, as discussed above, can be within a LUT(s) hosted by the cloud, where the B1 and Salt 1 are stored in association with the UUID1, which in itself is stored in association with the YID of the user. For example, as illustrated in FIG. 6, the Y! Cloud stores in the user model LUT the UUID1 in association with the user's YID, and in the service model LUT stored in the cloud (which is associated with the user model LUT), the B1 and Salt 1 are stored in association with the UUID1.

As illustrated in FIG. 6 and discussed above, Device 2 performs the authentication steps discussed above in relation to Steps 410-418. Device 2 sends UUID2 to the peripheral device ("Connected TV"), and in response, "B2" and "Salt 2" are generated upon performance of SRP, thereby registering Device 2 with the peripheral device. In some embodiments, as discussed above, the UUID2 sent from Device 2 is the UUID associated with Device 1 that was stored and subsequently retrieved (Steps 406 and 410-412).

As illustrated in FIG. 7, UUID2, B2 and Salt2 for Device 2 are now stored in the cloud database. For example, the user, under his/her account, has two UUIDs stored in association with his/her YID in the user model LUT: UUID1 and UUID2; and in the associated service model LUTs, under UUID the B1 and Salt1 are stored, and under UUID2 the B2 and Salt 2 are stored. Using these UUIDs, the respective devices can automatically pair with the peripheral as discussed above in relation to Process 400. For example, upon Device 2 being detected as being within proximity to the peripheral device (Connected TV), the UUID2 of Device 2 is confirmed in the database, and the B2 and Salt2 are sent to the Device 2 for automatic pairing.

As discussed above, according to some embodiments, if the account owner (e.g., the user) revokes the authorization of the second device, for example, the UUID of the second device (and the Salt and random key data associated with the second device) is removed from the account, and in order for the second device to pair with the peripheral device, it must be authenticated again according to Steps 410-418. Thus, as illustrated in FIG. 8, Device 2, for example, has its automatic pairing capabilities with the peripheral device revoked; therefore its UUID2 is deleted from the cloud database (e.g., as indicated by the UUID2 being "strikethrough" from the user model and service model). Such revocation can be performed by the user, on any device that is logged into the account, by an administrator, after a predetermined period of time, after devices are no longer within a proximity threshold to the peripheral, and the like, or some combination thereof. Therefore, in order for Device 2 to auto-pair with the peripheral TV again, it must perform Steps 410-418 again.

Thus, in accordance with the above discussion related to FIGS. 4-8, the disclosed systems and method provide the novel capability for devices logged into a central account to automatically pair with peripherals without having to go through a full, iterative and sometimes manual pairing process. This creates a new and improved way of accomplishing secure P2P pairing across multiple devices attached to a single account, and extends pairing functionality to provide a more seamless user experience.

As shown in FIG. 9, internal architecture 900 of a computing device(s), computing system, computing platform and the like includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk interface 908 and/or media disk drive interface 920 as an interface for a drive that can read and/or write to media including removable media such as floppy, CD-ROM, DVD, media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing image and/or video data for presentation at display 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 902 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
  receiving, at a computing device, login credentials for a user account from a first device;
  logging, via the computing device, the first device into the user account based on the login credentials;
  pairing, via the computing device, the first device with a peripheral device based on said first device being logged into said user account;
  receiving, at the computing device, said login credentials for the user account from the second device;
  logging, via the computing device, the second device into said user account based on the login credentials;
  determining, via the computing device, that said second device and the first device are logged into the same user account;
  automatically pairing, via the computing device, said second device to said peripheral device based on said determination;
  receiving, at the computing device, a request from the first device to log out of the user account; and
  unpairing, via the computing device, said second device from said peripheral device based on said request from the first device.

2. The method of claim 1, further comprising:
  unpairing said first device from said peripheral device based on said request from the first device.

3. The method of claim 1, further comprising:
  receiving a request from the second device to log out of the user account; and
  unpairing said second device from said peripheral device based on said request from said second device.

4. The method of claim 1, further comprising:
  receiving a login request from a third device to login to said user account;
  logging in said third device to said user account based on said request; and
  automatically pairing said third device to the peripheral device based on said third device being logged in to said user account and said first device already being logged in to the user account and paired with the peripheral device.

5. The method of claim 1, further comprising:
  receiving a request to revoke pairing capabilities of the second device; and
  unpairing said second device from said peripheral device.

6. The method of claim 5, wherein said request to revoke pairing capabilities is automatically generated based on information selected from a group consisting of: a time period, request from a user, a distance between the second device and the peripheral device, and a distance of the second device to a location associated with the peripheral device.

7. The method of claim 1, wherein said pairing of said first device comprises:
  receiving a universally unique identifier (UUID) of the first device;
  communicating Salt data and a key for unlocking the Salt data to the first device, wherein said pairing is based on said first device unlocking said Salt data.

8. The method of claim 7, wherein said second device is paired with said peripheral device based on the UUID, Salt data and said key.

9. A non-transitory computer-readable storage medium tangibly encoded with computer-executable instructions, such that when a computing device executes the instructions, a method is performed comprising:
receiving, at the computing device, login credentials for a user account from a first device;
logging, via the computing device, the first device into the user account based on the login credentials;
pairing, via the computing device, the first device with a peripheral device based on said first device being logged into said user account;
receiving, at the computing device, said login credentials for the user account from the second device;
logging, via the computing device, the second device into said user account based on the login credentials;
determining, via the computing device, that said second device and the first device are logged into the same user account;
automatically pairing, via the computing device, said second device to said peripheral device based on said determination;
receiving, at the computing device, a request from the first device to log out of the user account; and
unpairing, via the computing device, said second device from said peripheral device based on said request from the first device.

10. The non-transitory computer-readable storage medium of claim 9, further comprising:
unpairing said first device from said peripheral device based on said request from the first device.

11. The non-transitory computer-readable storage medium of claim 9, further comprising:
receiving a request from the second device to log out of the user account; and
unpairing said second device from said peripheral device based on said request from said second device.

12. The non-transitory computer-readable storage medium of claim 9, wherein said pairing of said first device comprises:
receiving a universally unique identifier (UUID) of the first device;
communicating Salt data and a key for unlocking the Salt data to the first device, wherein said pairing is based on said first device unlocking said Salt data.

13. The non-transitory computer-readable storage medium of claim 12, wherein said second device is paired with said peripheral device based on the UUID, Salt data and said key.

14. A computing device comprising:
a processor; and
a non-transitory computer-readable storage medium for tangibly storing thereon program logic for execution by the processor, the program logic comprising:
logic executed by the processor for receiving, at the computing device, login credentials for a user account from a first device;
logic executed by the processor for logging, via the computing device, the first device into the user account based on the login credentials;
logic executed by the processor for pairing, via the computing device, the first device with a peripheral device based on said first device being logged into said user account;
logic executed by the processor for receiving, at the computing device, said login credentials for the user account from the second device;
logic executed by the processor for logging, via the computing device, the second device into said user account based on the login credentials;
logic executed by the processor for determining, via the computing device, that said second device and the first device are logged into the same user account;
logic executed by the processor for automatically pairing, via the computing device, said second device to said peripheral device based on said determination;
logic executed by the processor for receiving, at the computing device, a request from the first device to log out of the user account; and
logic executed by the processor for unpairing, via the computing device, said second device from said peripheral device based on said request from the first device.

15. The computing device of claim 14, further comprising:
logic executed by the processor for unpairing said first device from said peripheral device based on said request from the first device.

16. The computing device of claim 14, further comprising:
logic executed by the processor for receiving a request from the second device to log out of the user account; and
logic executed by the processor for unpairing said second device from said peripheral device based on said request from said second device.

17. The computing device of claim 14, further comprising:
logic executed by the processor for receiving a request from the first device to log out of the user account;
logic executed by the processor for unpairing said first device from said peripheral device based on said request from the first device; and
unpairing said second device from said peripheral device based on said request from the first device.

* * * * *